United States Patent
Jiang

(10) Patent No.: US 10,474,507 B2
(45) Date of Patent: Nov. 12, 2019

(54) TERMINAL APPLICATION PROCESS MANAGEMENT METHOD AND APPARATUS

(71) Applicant: Tencent Technology (Shenzhen) Company Limited, Shenzhen (CN)

(72) Inventor: Peng Jiang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 140 days.

(21) Appl. No.: 15/625,701

(22) Filed: Jun. 16, 2017

(65) Prior Publication Data

US 2017/0286174 A1    Oct. 5, 2017

Related U.S. Application Data

(63) Continuation of application No. PCT/CN2016/080141, filed on Apr. 25, 2016.

(30) Foreign Application Priority Data

May 22, 2015    (CN) .......................... 2015 1 0267314

(51) Int. Cl.
     *G06F 9/46*      (2006.01)
     *G06F 9/50*      (2006.01)
     *G06F 9/48*      (2006.01)

(52) U.S. Cl.
     CPC ............ *G06F 9/5055* (2013.01); *G06F 9/485* (2013.01); *G06F 9/5022* (2013.01)

(58) Field of Classification Search
     CPC ....... G06F 9/5005; G06F 9/485; G06F 9/5022
     See application file for complete search history.

(56) References Cited

U.S. PATENT DOCUMENTS

| | | | | |
|---|---|---|---|---|
| 8,001,531 | B1* | 8/2011 | Rideout | G06F 11/3664 709/217 |
| 2003/0023661 | A1* | 1/2003 | Clohessy | G06F 9/5016 718/104 |
| 2004/0172390 | A1* | 9/2004 | Srivastava | G06F 9/5061 |

FOREIGN PATENT DOCUMENTS

| | | | |
|---|---|---|---|
| CN | 103106093 A | 5/2013 | |
| CN | 103530235 A | 1/2014 | |

(Continued)

OTHER PUBLICATIONS

Tencent Technology, Written Opinion, PCT/CN2016/080141, dated Jul. 14, 2016, 6 pgs.

(Continued)

*Primary Examiner* — Camquy Truong
(74) *Attorney, Agent, or Firm* — Morgan, Lewis & Bockius LLP

(57) ABSTRACT

A terminal application process management method includes: detecting a first-type terminal application, the first-type terminal application being a preset terminal application that needs to be accelerated but has not been started yet; obtaining attribute information of a second-type terminal application if the first-type terminal application is trigger-started, the second-type terminal application being another currently-running terminal application; and terminating a process of the second-type terminal application according to the attribute information of the second-type terminal application until there is sufficient resource for starting the first-type terminal application. Embodiments of the present invention further provide a terminal application process management apparatus.

11 Claims, 10 Drawing Sheets

(56) References Cited

FOREIGN PATENT DOCUMENTS

| CN | 103699413 | A | 4/2014 |
|---|---|---|---|
| CN | 103853610 | A | 6/2014 |
| CN | 103957208 | A | 7/2014 |
| CN | 104090745 | A | 10/2014 |
| CN | 104142828 | A | 11/2014 |
| CN | 104142828 | * | 12/2014 |
| CN | 104601770 | A | 5/2015 |

OTHER PUBLICATIONS

Tencent Technology, IPRP, PCT/CN2016/080141, Nov. 27, 2017, 7 pgs.
Tencent Technology, ISR, PCT/CN2016/080141, Jul. 14, 2016, 2 pgs.

* cited by examiner

A game box has been added

Try to start the game from the desktop game box !

TERMINAL APPLICATION PROCESS MANAGEMENT METHOD AND APPARATUS

PRIORITY CLAIM AND RELATED APPLICATION

This application is a continuation application of PCT Patent Application No. PCT/CN2016/080141, entitled "TERMINAL APPLICATION PROCESS MANAGEMENT METHOD AND APPARATUS" filed on Apr. 25, 2016, which claims priority to Chinese Patent Application No. 201510267314.2, entitled "TERMINAL APPLICATION PROCESS MANAGEMENT METHOD AND APPARATUS" filed on May 22, 2015, both of which are incorporated by reference in their entirety.

FIELD OF THE TECHNOLOGY

The present disclosure relates to the field of communications technologies, and in particular, to a terminal application process management method and apparatus.

BACKGROUND OF THE DISCLOSURE

With the rapid development of Internet technologies, on the Internet, there are increasing resources available for living and studying, and leisure and recreation of users, and the users have an increasingly high requirement on use of the resources. Using mobile games as an example, currently most games on the market have a relatively high requirement on software and hardware performance of a mobile phone. When a user plays a game on the mobile phone, frame freezing often occurs, running of the game is not smooth, and user experience is affected.

Currently, some existing methods for resolving frame freezing of a game include: upgrading software and hardware of a mobile phone, uninstalling a terminal application on the mobile phone, cleaning storage space of the mobile phone by using system management software (such as the Tencent Mobile Manager and the Mobile Phone Smart Guard), terminating a process of a terminal application by using the system management software, and the like. For example, the Tencent Mobile Manager provides a one-touch acceleration function, which can release memory of a mobile phone by terminating processes of some terminal applications, so as to achieve an effect of smooth running of the entire mobile phone.

Because most existing methods for resolving the problem of frame freezing of a game need to be manually triggered by a user, an operation is relatively complex and acceleration efficiency is low.

SUMMARY

An objective of the present disclosure is to provide a terminal application process management method and apparatus, so as to simplify an acceleration operation of a terminal application, and improve acceleration efficiency of the terminal application.

To resolve the foregoing technical problems, embodiments of the present invention provide the following technical solutions:

A terminal application process management method includes:

detecting a first-type terminal application to obtain a detection result, the first-type terminal application being a preset terminal application that needs to be accelerated but has not been started yet;

obtaining attribute information of a second-type terminal application when the detection result indicates that the first-type terminal application is trigger-started, the second-type terminal application being another currently-running terminal application; and terminating a process of the second-type terminal application according to the attribute information of the second-type terminal application until there is sufficient resource for starting the first-type terminal application.

To resolve the foregoing technical problems, the embodiments of the present invention further provide the following technical solutions:

A terminal application process management apparatus includes:

a first detection module, configured to detect a first-type terminal application to obtain a detection result, the first-type terminal application being a preset terminal application that needs to be accelerated but has not been started yet;

an information obtaining module, configured to obtain attribute information of a second-type terminal application when the detection result indicates that the first-type terminal application is trigger-started, the second-type terminal application being another currently-running terminal application; and a process terminating module, configured to end a process of the second-type terminal application according to the attribute information of the second-type terminal application.

To resolve the foregoing technical problems, the embodiments of the present invention further provide the following technical solutions:

A non-transitory computer readable storage medium stores a processor executable instruction, the processor executable instruction being configured to enable a processor to complete the following operations:

detecting a first-type terminal application to obtain a detection result, the first-type terminal application being a preset terminal application that needs to be accelerated but has not been started yet;

obtaining attribute information of a second-type terminal application when the detection result indicates that the first-type terminal application is trigger-started, the second-type terminal application being another currently-running terminal application; and terminating a process of the second-type terminal application according to the attribute information of the second-type terminal application until there is sufficient resource for starting the first-type terminal application.

Compared with the existing technology, according to this embodiment, a preset first-type terminal application that needs to be accelerated is detected. If it is detected that the first-type terminal application is currently trigger-started, it may be considered that currently a user needs to run the trigger-started first-type terminal application, and a process of another currently-running terminal application needs to be ended according to attribute information of the corresponding terminal application, so as to ensure that the first-type terminal application that needs to run runs smoothly without frame freezing. Compared with the existing manner in which a user needs to manually trigger acceleration, in this embodiment, an acceleration operation of a terminal application is simplified, and acceleration efficiency of the terminal application is improved.

BRIEF DESCRIPTION OF THE DRAWINGS

The following describes specific implementation manners of the present disclosure in detail with reference to the accompanying drawings, so as to make the technical solutions and other beneficial effects of the present disclosure obvious.

DESCRIPTION OF EMBODIMENTS

Figure 1:
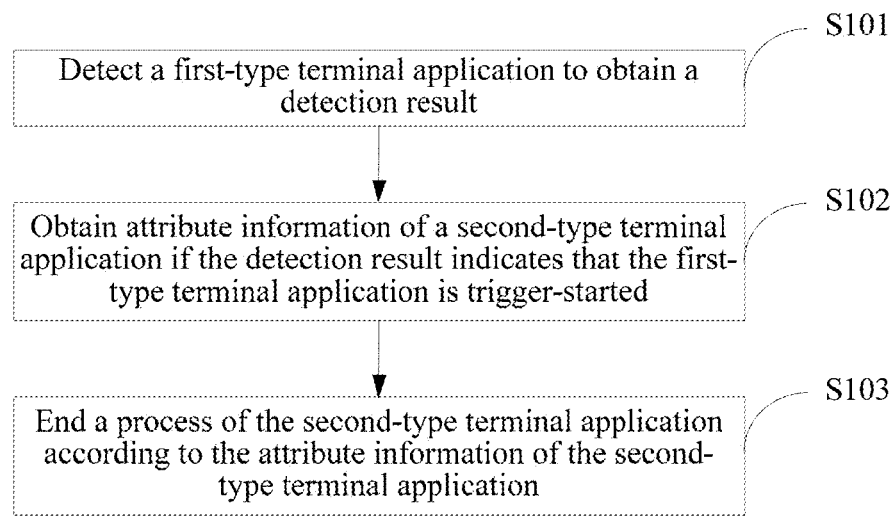
FIG. 1 is a schematic flowchart of a terminal application process management method according to a first embodiment of the present invention.

Referring to the drawings, same component symbols represent same components. The principle of the present disclosure is described by using examples in which the present disclosure is implemented in a proper computing environment. The following descriptions are specific embodiments of the present disclosure based on the examples, and should not be construed as a limitation to other specific embodiments of the present invention that are not described herein in detail.

In the description that follows, the present disclosure will be described with reference to steps and symbolic representations of operations that are performed by one or more computers, unless indicated otherwise. As such, it will be understood that such steps and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the present disclosure is being described in the foregoing context, it is not meant to be limiting as those of skill in the art will appreciate that multiple steps and operation described below may also be implemented in hardware.

The principle of the present disclosure is performed by using many other general-purpose or specific-purpose operations, communications environment, or configurations. A known example which is suitable for being applied to a calculation system, an environment, and a configuration of the present disclosure may include (but is not limited to) a mobile phone, a personal computer, a server, a multiprocessor system, a microcomputer dedicated system, a host architecture type computer, and a distributed calculation environment, which include any one of the foregoing systems or apparatuses.

A term "module" used in the specification may be considered as a software object executed in the calculation system. Different components, modules, engines, and services described in the specification may be considered as objects implemented in the calculation system. The apparatus and method described in the specification is preferably implemented in a form of software, and definitely can be implemented in a form of hardware, both of which fall within the protection scope of the present disclosure.

It should be understood that the sequence of embodiments below is not limited to the sequence number of the embodiments, that is, the first embodiment is not the optimal embodiment, and the first embodiment may be set according to an actual demand. For example, the first embodiment may be implemented as the second preferred embodiment, the third embodiment may be implemented as the first preferred embodiment, and descriptions of the first, the second, and the like are only used for representation.

The embodiments of the present invention provide a terminal application process management method and apparatus. The terminal application process management method and apparatus may be integrated to run on a terminal. The terminal may include a terminal such as a notebook computer, a tablet personal computer (PC), or a mobile phone that has a storage unit, that has a microprocessor installed, and that has a computing capability. This is not limited in detail in the present disclosure.

The terminal detects a first-type terminal application that needs to be accelerated, if a detection result indicates that the first-type terminal application is trigger-started, for example, the first-type terminal application is trigger-started by a user by means of clicking or sliding, it may be considered that currently the user needs to run the trigger-started first-type terminal application, and a process of another corresponding terminal application needs to be ended according to attribute information of the terminal application that is currently running on the terminal, so as to ensure that the first-type terminal application that needs to run runs smoothly without frame freezing. In addition, a process in which related processes are automatically detected and ended simplifies an acceleration operation of the terminal application, thereby improving acceleration efficiency of the terminal application.

Detailed descriptions are made below separately.

First Embodiment

This embodiment is described from the perspective of a terminal. A terminal application process management method includes: detecting a first-type terminal application to obtain a detection result, the first-type terminal application being a preset terminal application that needs to be accelerated but has not been started yet; obtaining attribute information of a second-type terminal application when the detection result indicates that the first-type terminal application is trigger-started, the second-type terminal application being another currently-running terminal application; and terminating a process of the second-type terminal application according to the attribute information of the second-type terminal application until there is sufficient resource for starting the first-type terminal application.

FIG. 1 is a schematic flowchart of a terminal application process management method according to the first embodiment of the present invention. The method includes the following steps:

Step S101. Detect a first-type terminal application to obtain a detection result.

The first-type terminal application is a preset terminal application that needs to be accelerated.

Specifically, the first-type terminal application may be set according to a requirement or a habit of use of a user, for example, the first-type terminal application may be a terminal application that is frequently used. Alternatively, first-type terminal applications may be automatically set by a terminal according to attribute information of the first-type terminal applications. For example, the terminal may determine that the first-type terminal applications are terminal applications of a same application type according to an analysis of package name information of the first-type terminal applications.

Step S102. Obtain attribute information of a second-type terminal application when the detection result indicates that the first-type terminal application is trigger-started.

The second-type terminal application is another currently-running terminal application. The attribute information of the second-type terminal application may specifically include such information as a full name or an abbreviation, which indicates an identity of the terminal application, of the second-type terminal application.

It may be understood that when it is detected that the first-type terminal application is trigger-started, it may be determined that the trigger-started first-type terminal application is running. The second-type terminal application in this embodiment refers to a terminal application in currently-running terminal applications except the first-type terminal application.

Step S103. End a process of the second-type terminal application according to the attribute information of the second-type terminal application.

For example, if the first-type terminal application is trigger-started by the user by means of clicking or sliding, it may be considered that currently the user needs to run the terminal application, so that a terminal needs to end a process of another running terminal application (that is, the second-type terminal application) according to attribute information of the terminal applications that are currently running on the terminal, so as to ensure that a terminal application (that is, the first-type terminal application) that needs to run runs smoothly without frame freezing.

It may be understood that a process refers to an example of a running program. In a broad sense, a process is a running activity of a program, which has a particular independent function, with respect to a data set. A process is a basic unit of dynamic execution of an operating system. In a conventional operating system, a process is a basic allocation unit and a basic execution unit.

"Ending processes of corresponding terminal applications", also "cleaning processes", refers to terminating processes of application programs that are running on a mobile phone. For example, on an Android mobile phone, a system provides an interface for cleaning a process, a system interface may be directly invoked, and details are not described herein again.

In some implementations, before "detecting a first-type terminal application", the method may further include the following steps.

(1) Determine whether there is a preset first-type local terminal application set.

The first-type terminal application set includes at least one first-type terminal application.

For example, a manifestation of the first-type terminal application set may be similar to a folder on a mobile phone desktop. If the folder is a game box, the game box includes multiple games, or the like.

(2) Detect a preset first-type terminal application set if locally there is the preset first-type terminal application set, and obtain attribute information of currently-running terminal applications when it is determined that the terminal application set is currently trigger-started, end processes of the corresponding terminal applications according to the attribute information of the currently-running terminal applications, and perform the step of detecting a first-type terminal application.

(3) Perform the step of detecting a first-type terminal application, if locally there is no preset first-type terminal application set.

Specifically, in a case in which it is determined that locally there is the preset first-type terminal application set, when it is determined that the set is currently trigger-started, it may be considered that a next operation of the user may be to run the first-type terminal application in the set, so that processes of corresponding terminal applications may be ended according to attribute information of the terminal applications that are currently running on the terminal, so as to ensure that the first-type terminal application that needs to run runs smoothly without frame freezing. In a case in which it is determined that locally there is no preset first-type terminal application set, the first-type terminal application is detected directly.

It may be known from the foregoing description that according to the terminal application process management method provided in this embodiment, a preset first-type terminal application that needs to be accelerated is detected; and when it is determined that the first-type terminal application is currently trigger-started, it may be considered that currently a user needs to run the trigger-started first-type terminal application, and a process of another corresponding terminal application needs to be ended according to attribute information of the another currently-running terminal application, so as to ensure that the first-type terminal application that needs to run runs smoothly without frame freezing. Compared with the existing manner in which a user needs to manually trigger acceleration, in this embodiment, an acceleration operation of a terminal application is simplified, and acceleration efficiency of the terminal application is improved.

Second Embodiment

According to the method described in the first embodiment, a further detailed description is made below by using examples.

In this embodiment, a terminal automatically cleans processes to implement an effect of accelerating a first-type terminal application that needs to be started, which may include three parts: (1) automatically cleaning processes when a first-type terminal application set is started; (2) automatically cleaning the processes when the first-type terminal application is started in the first-type terminal application set; and (3) cleaning the processes in a running process of the first-type terminal application after the first-type terminal application is started. Analyses and descriptions are made separately below.

Figure 2A:
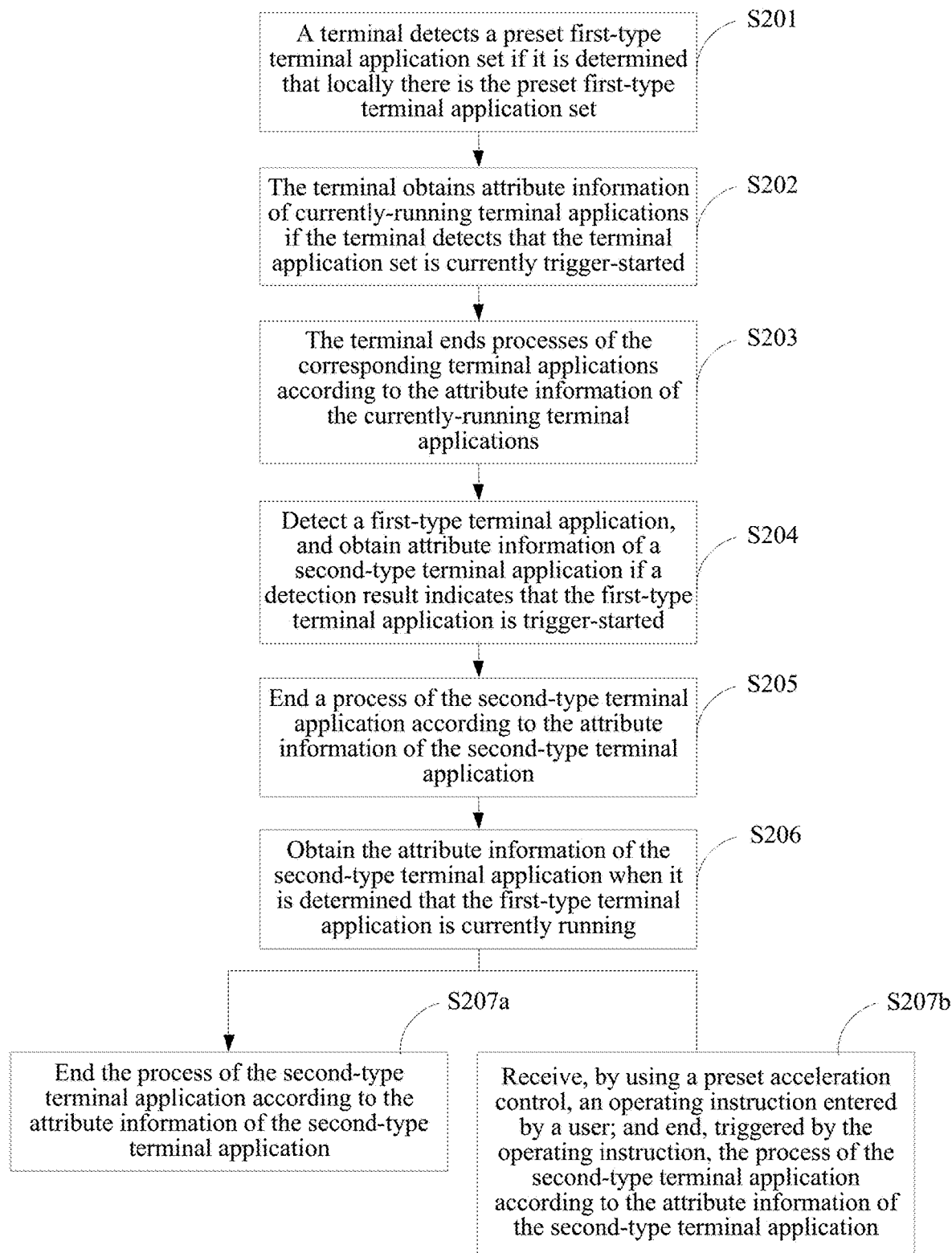
FIG. 2*a* is a schematic flowchart of a terminal application process management method according to a second embodiment of the present invention.

Referring to FIG. 2a, FIG. 2a is a schematic flowchart of a terminal application process management method according to the second embodiment of the present invention. The method includes the following steps:

Step S201. A terminal detects a preset first-type terminal application set if it is determined that locally there is the preset first-type terminal application set.

Step S202. The terminal obtains attribute information of currently-running terminal applications if the terminal detects that the terminal application set is currently trigger-started.

Step S203. The terminal ends processes of the corresponding terminal applications according to the attribute information of the currently-running terminal applications.

Step S201 to step S203 may be specifically: automatically cleaning the processes when the first-type terminal application set is started.

In this embodiment, the first-type terminal application set includes at least one first-type terminal application, and the first-type terminal application is a preset terminal application that needs to be accelerated.

In some implementations, the first-type terminal application set in this embodiment may be specifically a "game box". The "game box" is a functional module of the Tencent Mobile Manager, and is mainly configured to recognize and gather games on a user mobile phone to a central entry, to facilitate an operation of a user.

The following describes creation of the game box.

Figure 2B:
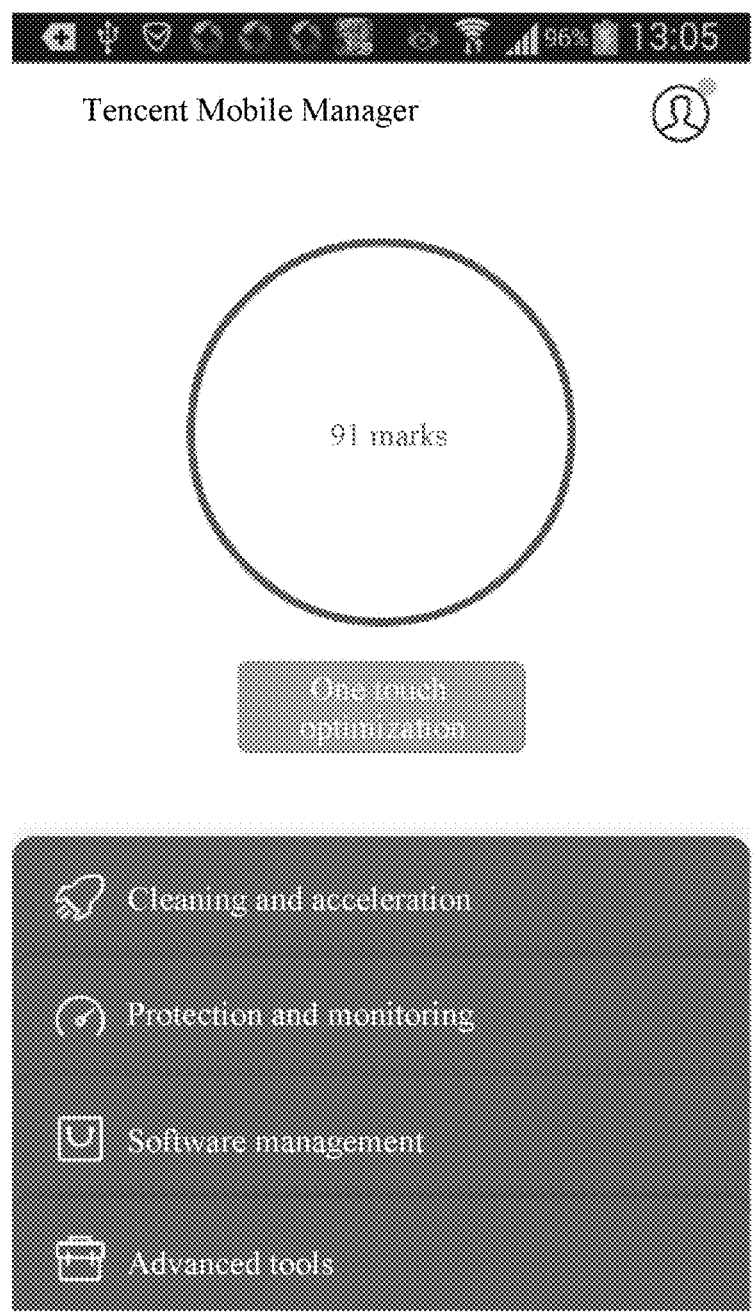
FIG. 2*b* to FIG. 2*h* are schematic diagrams of terminal interfaces in the terminal application process management method according to the second embodiment of the present invention.
Figure 2C:
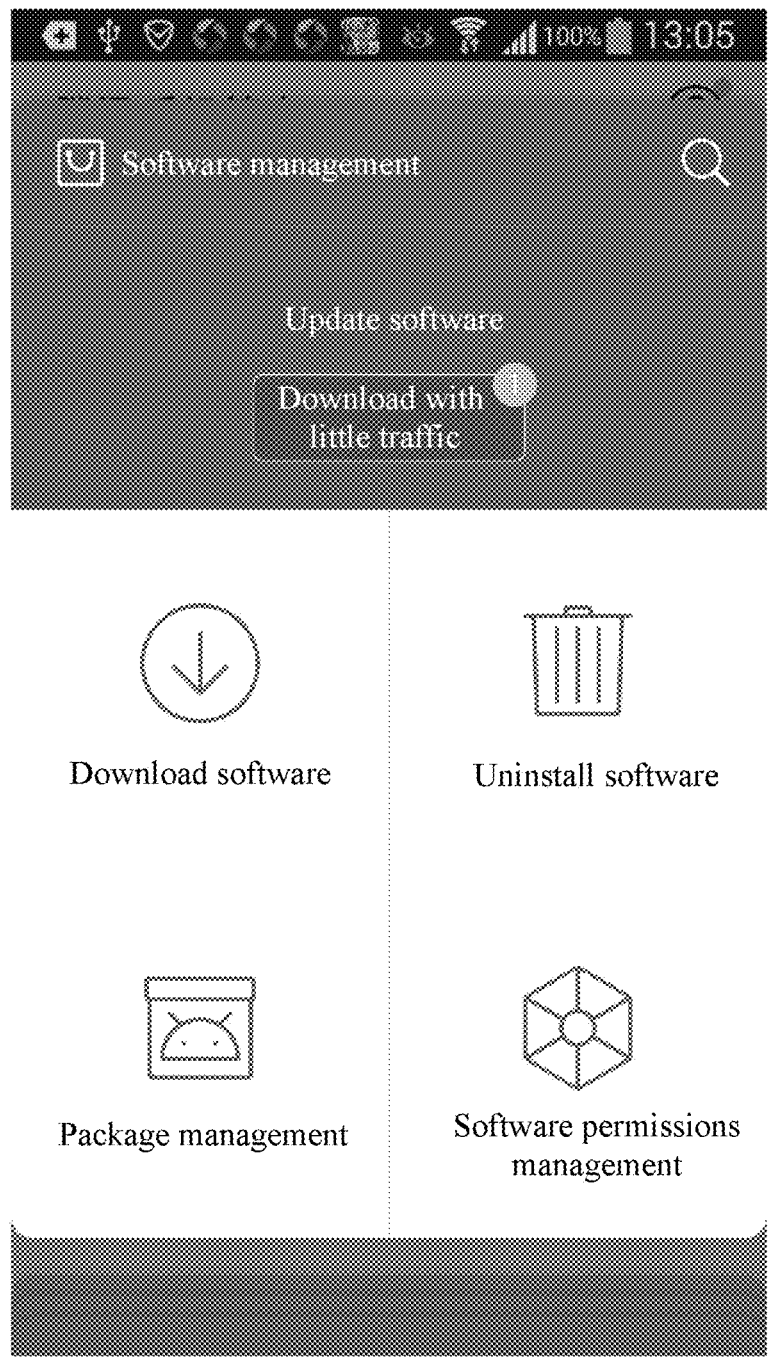
Figure 2D:
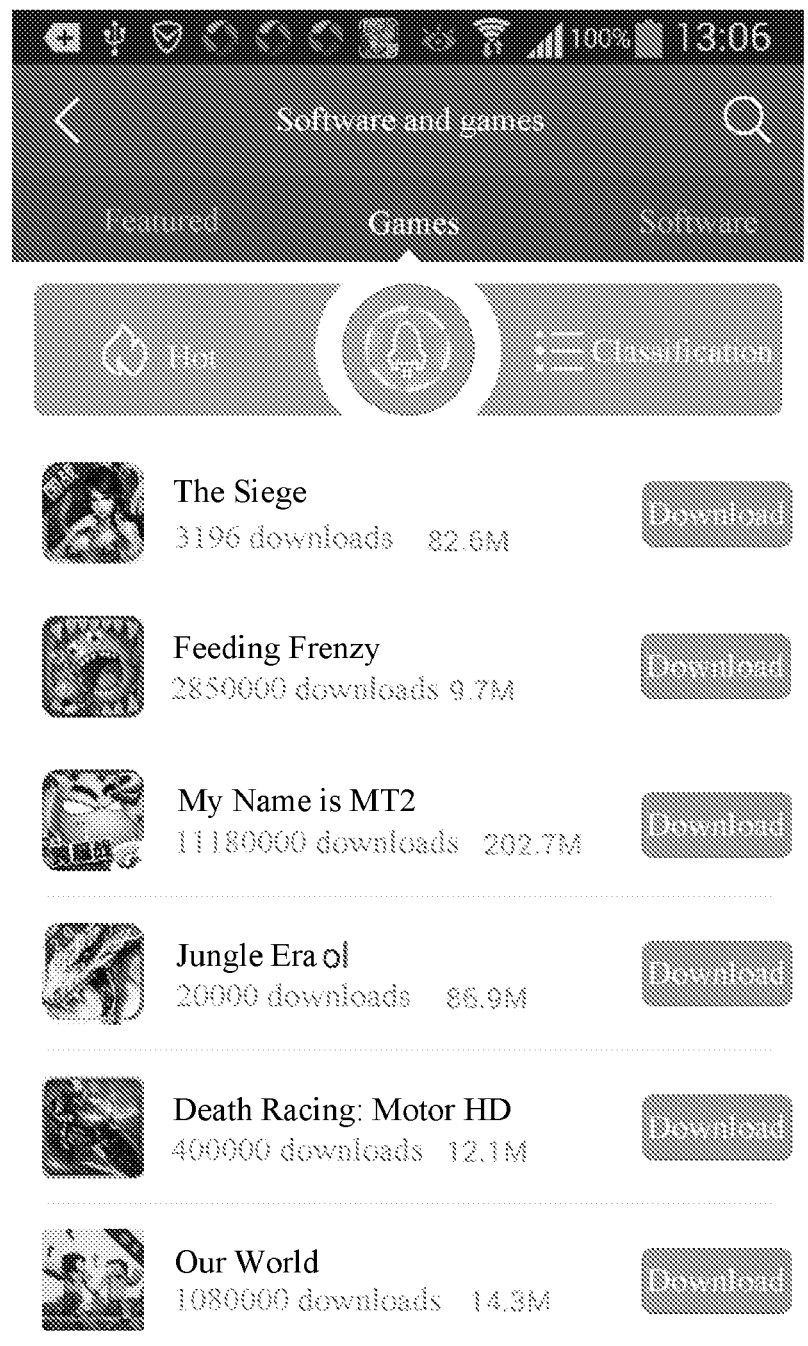
Figure 2E:
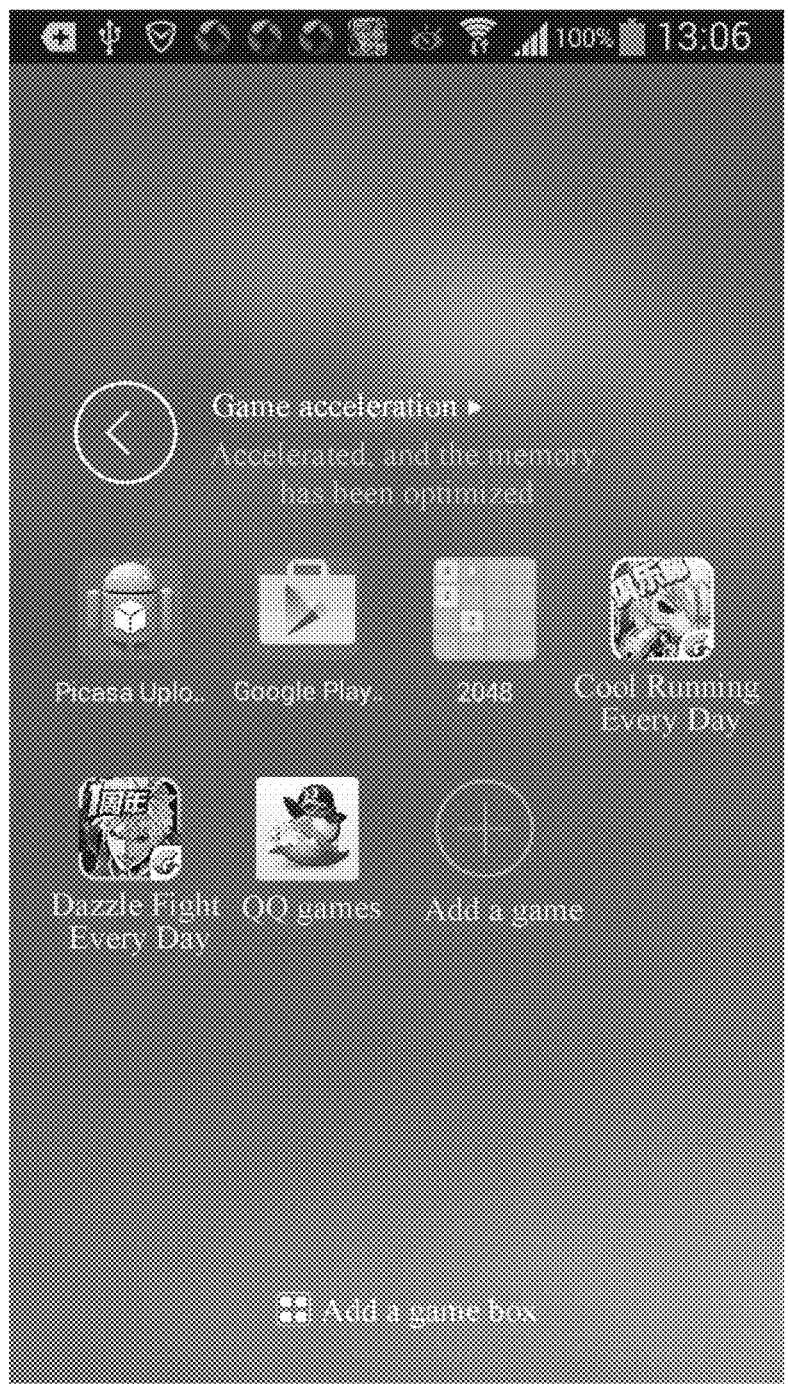

First, when the user needs to manage a mobile phone application process, the user may first start a mobile phone acceleration mode of the Tencent Mobile Manager. As shown in FIG. 2b, FIG. 2b is a home page of the Tencent Mobile Manager. When the terminal receives an operating instruction of clicking a "software management" control from the user, the terminal may switch to a software management interface shown in FIG. 2c. In this interface, when the terminal receives an operating instruction of clicking a "software download" control of the user, the terminal may jump to a software download interface, and display a corresponding software download interface according to a software type selected by the user, as shown in FIG. 2d, and FIG. 2d is a software game interface; in this interface, when the terminal receives an operating instruction of clicking an acceleration control (for example, a round button in the middle) of the user, the terminal may directly jump to a game acceleration page, as shown in FIG. 2e. It may be understood that games (such as 2048 and Cool Running Every Day) displayed on the page are games that are downloaded and installed on the mobile phone, and a set of the games displayed on this page is also the first-type terminal application set in this embodiment.

Figure 2F:
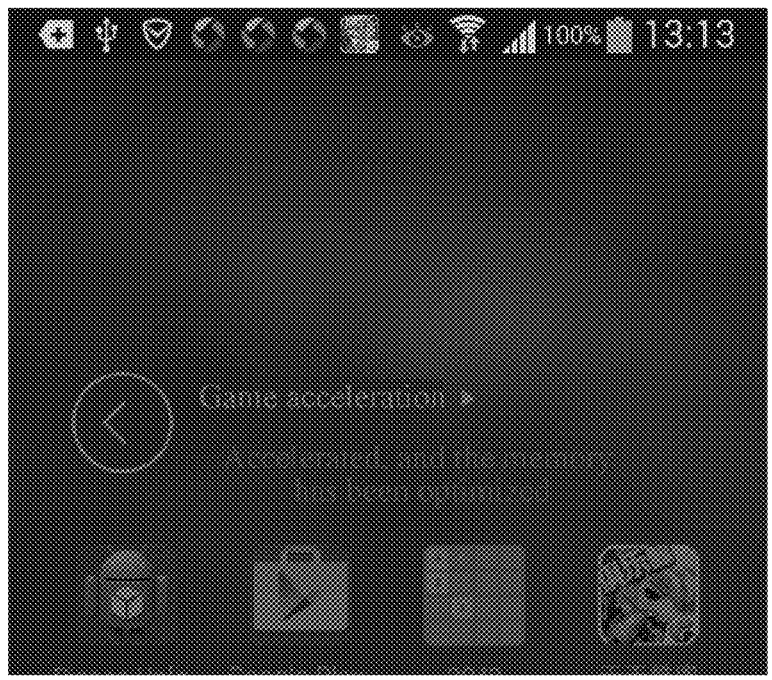
Figure 2F:
Figure 2G:
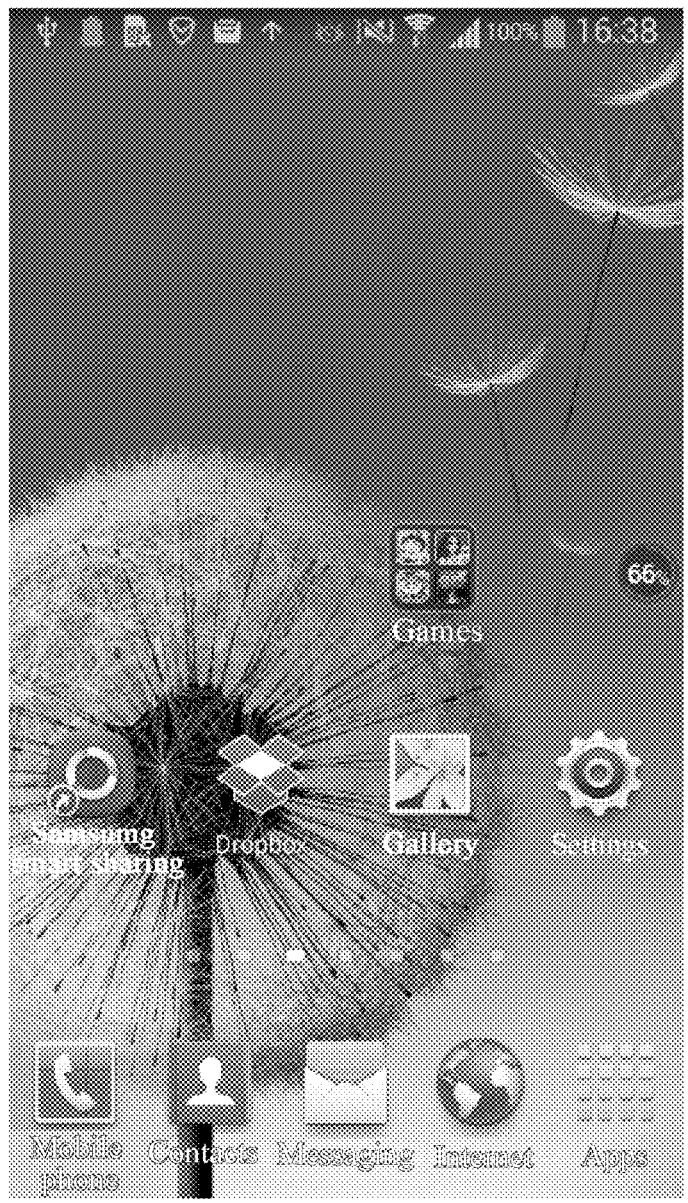

An "add a game box" control is set at the bottom of the game acceleration page shown in FIG. 2e, and when the terminal receives an operating instruction of clicking "add a game box" of the user, the terminal can immediately complete manual creation of a desktop game box on the game acceleration home page, as shown in FIG. 2f, and FIG. 2f is a schematic diagram of successfully creating a game box. Also referring to FIG. 2g, FIG. 2g is a form of the game box on the mobile phone desktop when the game box is ended. The game box is similar to a shape of a folder on the mobile phone desktop, and includes multiple game applications.

It may be understood that in some implementation manners, the desktop game box may be automatically created by the Tencent Mobile Manager, a creation process may be implemented by referring to the existing technologies, and details are not described herein again.

As shown in FIG. 2g, after the "game box" is created on the mobile phone desktop, the mobile phone detects the game box on the desktop in real time, and when the user needs to run a game application in the "game box" currently, the user only needs to directly click the "game box".

Figure 2H:
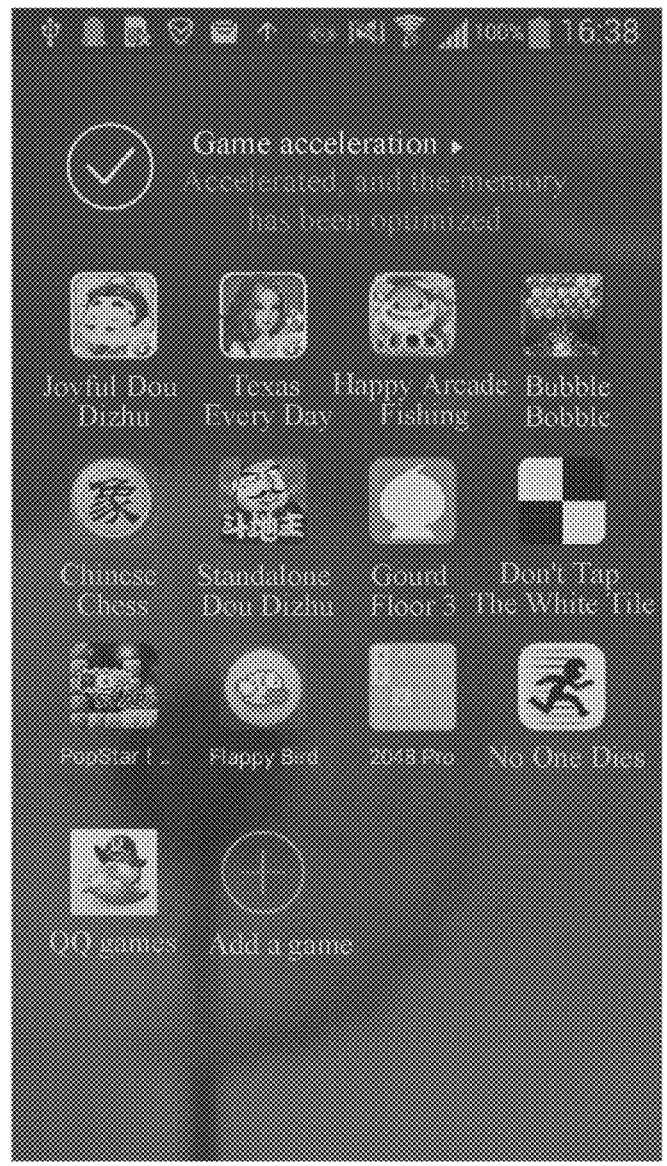

Further, if the terminal receives an operating instruction of clicking the "game box" of the user, it may be considered that the terminal detects that the game box is currently trigger-started, as shown in FIG. 2h, FIG. 2h is a form of the game box when the game box is started, and the game box includes the games that are installed on the mobile phone of the user. It may be understood that it may be considered that when the game box is started, a next operation of the user may be to run the game application in the game box, so that the terminal obtains attribute information of currently-running terminal applications, and cleans processes of corresponding terminal applications according to the attribute information, so as to ensure that a game that needs to run runs smoothly without frame freezing.

Cleaning the processes refers to terminating processes of application programs that are running on the mobile phone. For example, on an Android mobile phone, a system provides an interface for cleaning a process, and the mobile phone only needs to invoke the system interface.

In this embodiment, when the user starts the game box, acceleration is performed immediately, that is, processes of all terminal applications in the system are cleaned. Because after the user starts the game box, the next operation of the user may probably be to run the game in the box, so that after the acceleration for this time, the mobile phone may be adjust to an optimal condition quickly, and when the user starts the game, the game will be quite smooth. Effects of the acceleration for this time is directly displayed to the user, for example, to which value available memory of the mobile phone is improved, and whether an optimal value is reached.

Step S204. Detect a first-type terminal application, and obtain attribute information of a second-type terminal application if a detection result indicates that the first-type terminal application is trigger-started.

The second-type terminal application is another currently-running terminal application.

Step S205. End a process of the second-type terminal application according to the attribute information of the second-type terminal application.

Step S204 and step S205 may be specifically: performing automatic cleaning when the first-type terminal application is started in a terminal application folder.

For example, after automatic process cleaning is performed for the first time, the games in the game box is detected in real time, and when it is detected that any game in the game box is currently trigger-started (for example, a game "Joyful Dou Dizhu" is trigger-started by the user by means of clicking or sliding), it may be considered that the user needs to run the "Joyful Dou Dizhu", so that attribute information of terminal applications that are currently running on the terminal is obtained, and processes of corresponding terminal applications except the "Joyful Dou Dizhu" are cleaned according to the information, so as to ensure that the game "Joyful Dou Dizhu" runs smoothly without frame freezing.

It may be understood that when the user clicks a game icon in the game box to start a game, automatic process cleaning is performed immediately again. The process cleaning is different with cleaning performed when the game box is started, because the game that is currently started needs to be protected, so as to ensure that the game will not be cleaned, or otherwise, the user cannot start the game.

Step S206. Obtain the attribute information of the second-type terminal application when it is determined that the first-type terminal application is currently running.

Step S207a. End the process of the second-type terminal application according to the attribute information of the second-type terminal application.

Step S206 and step S207a may be specifically: cleaning the processes in a running process of the first-type terminal application.

For example, in a process in which the user plays a game, a part of terminal applications may be started in the background, which causes frame freezing of the game. In this case, processes of the terminal applications need to be detected and processed again.

Details may be specifically as follows:

(1) detecting whether frame freezing occurs during running of the first-type terminal application, when it is determined that the first-type terminal application is currently running; and The "detecting whether frame freezing occurs during running of the first-type terminal application" may further be determined in the following manners, including the following steps:

(a) detecting a quantity of screen frame;

(b) determining that frame freezing occurs during running of the first-type terminal application, when it is determined that the quantity of screen frames is less than a preset threshold; and (c) determining that frame freezing does not occur during running of the first-type terminal application, when it is determined that the quantity of screen frames is greater than or equal to the preset threshold.

(2) obtaining the attribute information of the second-type terminal application, when it is determined that frame freezing occurs during running of the first-type terminal application.

That is, occurrence of a frame freezing phenomenon may be monitored by using another technology such as counting the quantity of screen frames, and then directly performs acceleration on the mobile phone to clean unrelated processes other than a game "Joy landlords".

In some implementations, a mobile phone may also provide a quick entry (for example, a floating window), so that a user manually cleans a process in a game process, and performs acceleration readily, of which steps may be specifically as follows:

Step S207b. Receive, by using a preset acceleration control, an operating instruction entered by a user; and end, triggered by the user-entered operating instruction, the process of the second-type terminal application according to the attribute information of the second-type terminal application.

In addition, if the user does not start the game from the game box, the mobile phone can also obtain currently-running terminal applications in a manner of terminal application monitoring, and if the terminal application is a game in the game box, cleaning and acceleration may be perform immediately. For a specific implementation process, reference may be made to contents related to the Embodiment 1, and details are not described herein again.

It may be easily considered that the present disclosure describes acceleration of a game, but an application range is not limited to the game. Any terminal application may be gathered to a set similar to the game box, and when the set or the terminal application in the set is started, a similar acceleration operation may be performed.

It may be known from the foregoing description that according to the terminal application process management method provided in this embodiment, a first-type terminal application set is preset, the first-type terminal application set including multiple first-type terminal applications; the first-type terminal application set is detected in real time; and when it is determined that the first-type terminal application set is currently trigger-started, it may be considered that a next operation of a user may be to run a first-type terminal application in the set, so that processes of corresponding terminal applications may be ended according to attribute information of terminal applications that are currently running on the terminal; second, when the first-type terminal application is trigger-started, a process of another terminal application needs to be cleaned; and finally, in a running process of the first-type terminal application, the process of the another terminal application is detected and cleaned again. By cleaning the process for three times, it is ensured that the first-type terminal application that needs to run runs smoothly without frame freezing. Compared with the existing manner in which a user needs to manually trigger acceleration, in this embodiment, an acceleration operation of a terminal application is simplified, and acceleration efficiency of the terminal application is improved.

Third Embodiment

For ease of better implementing the terminal application process management method provided in the embodiments of the present invention, the embodiments of the present invention further provide an apparatus based on the foregoing terminal application process management method. Nouns have meanings that are the same as those in the foregoing terminal application process management method. For specific implementation details, reference may be made to the description in the method embodiments.

Figure 3:
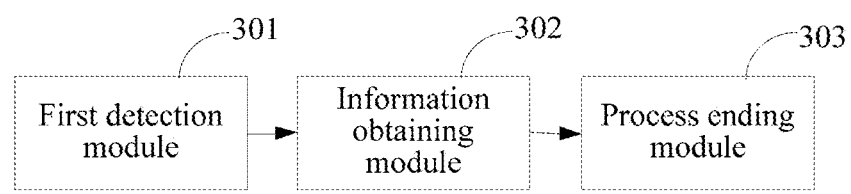
FIG. 3 is a schematic structural diagram of a terminal application process management apparatus according to a third embodiment of the present disclosure.

Referring to FIG. 3, FIG. 3 is a schematic structural diagram of a terminal application process management apparatus according to this embodiment of the present invention. The terminal application process management apparatus may include a first detection module 301, an information obtaining module 302, and a process terminating module 303.

The first detection module 301 is configured to detect a first-type terminal application to obtain a detection result, the first-type terminal application being a preset terminal application that needs to be accelerated.

Specifically, the first-type terminal application may be set according to a requirement or a habit of use of a user, for example, the first-type terminal application may be a terminal application that is frequently used. Alternatively, first-type terminal applications may be automatically set by a terminal according to attribute information of the first-type terminal applications. For example, the terminal may determine that the first-type terminal applications are terminal applications of a same application type according to an analysis of package name information of the first-type terminal applications.

The information obtaining module 302 is configured to obtain attribute information of a second-type terminal application when the detection result indicates that the first-type terminal application is trigger-started, the second-type terminal application being another currently-running terminal application.

The attribute information of the second-type terminal application may specifically include such information as a full name or an abbreviation, which indicates an identity of the terminal application, of the second-type terminal application.

It may be understood that when it is detected that the first-type terminal application is trigger-started, it may be determined that the trigger-started first-type terminal application is running. The second-type terminal application in this embodiment refers to a terminal application in currently-running terminal applications except the first-type terminal application.

The process terminating module is configured to end a process of the second-type terminal application according to the attribute information of the second-type terminal application.

For example, if the first-type terminal application is trigger-started by the user by means of clicking or sliding, it may be considered that currently the user needs to run the terminal application, so that a terminal needs to end a process of another running terminal application (that is, the second-type terminal application) according to attribute information of the terminal applications that are currently running on the terminal, so as to ensure that the terminal application (that is, the first-type terminal application) that needs to run runs smoothly without frame freezing.

It may be understood that a process refers to an example of a running program, and is a running activity of a program, which has a particular independent function, with respect to a data set. A process is a basic unit of dynamic execution of an operating system. In a conventional operating system, a process is a basic allocation unit and a basic execution unit.

"Ending processes of corresponding terminal applications", also, "cleaning processes", refers to terminating processes of application programs that are running on a mobile phone. For example, on an Android mobile phone, a system provides an interface for cleaning a process, a system interface may be directly invoked, and details are not described herein again.

It may be known from the foregoing description that according to the terminal application process management apparatus provided in this embodiment, a preset first-type terminal application that needs to be accelerated is detected; and when it is determined that the first-type terminal application is currently trigger-started, it may be considered that currently a user needs to run the trigger-started first-type terminal application, and a process of another corresponding terminal application needs to be ended according to attribute information of the another currently-running terminal application, so as to ensure that the first-type terminal application that needs to run runs smoothly without frame freezing. Compared with the existing manner in which a user needs to manually trigger acceleration, in this embodiment, an acceleration operation of a terminal application is simplified, and acceleration efficiency of the terminal application is improved.

Fourth Embodiment

According to the apparatus described in the third embodiment, a further detailed description is made below.

Figure 4:
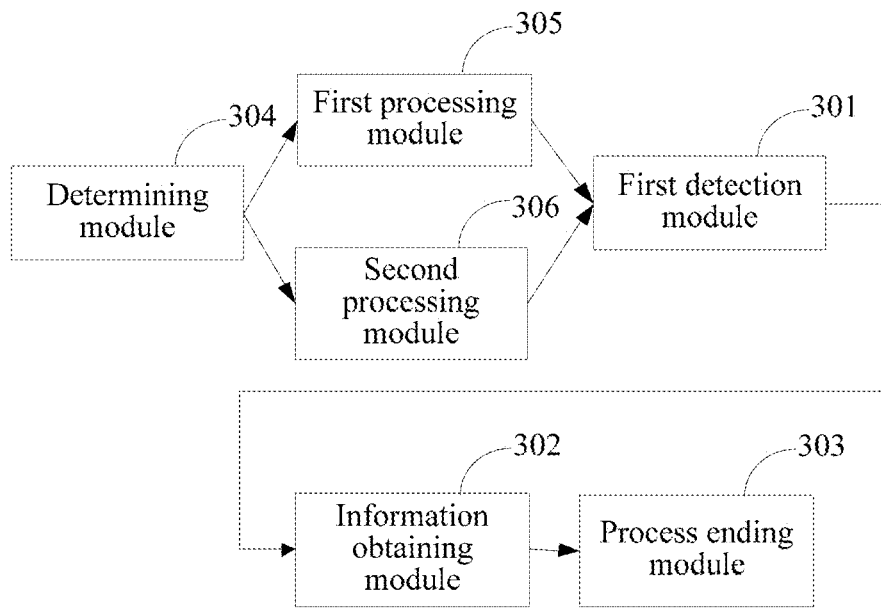
FIG. 4 is a schematic structural diagram of a terminal application process management apparatus according to a fourth embodiment of the present disclosure.

Referring to FIG. 4, FIG. 4 is a schematic structural diagram of a terminal application process management apparatus according to this embodiment of the present invention. In some implementations, the terminal application process management apparatus may further include the following components.

(1) A determining module 304 is configured to determine whether there is a preset first-type local terminal application set, the first-type terminal application set including at least one first-type terminal application.

The first-type terminal application set includes at least one first-type terminal application.

For example, a manifestation of the first-type terminal application set may be similar to a folder on a mobile phone desktop. If the folder is a game box, the game box includes multiple games, or the like.

(2) A first processing module 305 is configured to: detect a preset first-type terminal application set if locally there is the preset first-type terminal application set, and, obtain attribute information of currently-running terminal applications when it is determined that the terminal application set is currently trigger-started, end processes of the corresponding terminal applications according to the attribute information of the currently-running terminal applications, and trigger the first detection module 301 to perform the step of detecting a first-type terminal application.

(3) A second processing module 306 is configured to trigger the first detection module 301 to perform the step of detecting a first-type terminal application, if locally there is no preset first-type terminal application set.

Specifically, in a case in which it is determined that locally there is the preset first-type terminal application set, when it is determined that the set is currently trigger-started, it may be considered that a next operation of the user may be to run the first-type terminal application in the set, so that processes of corresponding terminal applications need to be ended according to attribute information of the terminal applications that are currently running on the terminal. That is, when the first-type terminal application set is started, the terminal automatically cleans processes, so as to ensure that the terminal application that needs to run runs smoothly without frame freezing. In a case in which it is determined that locally there is no preset first-type terminal application set, the first-type terminal application is detected directly.

For example, after automatic cleaning is performed on the first-type terminal application set for the first time, the first-type terminal application in the first-type terminal application set may be detected in real time. When it is detected that the first-type terminal application in the first-type terminal application set is currently trigger-started, for example, the first-type terminal application is trigger-started by the user by means of clicking or sliding, it may be considered that the user needs to run the first-type terminal application. The attribute information of the terminal applications that are currently running on the terminal is obtained, and a process of another running terminal application is cleaned according to the information, so as to ensure that the first-type terminal application that needs to run runs smoothly without frame freezing.

In this case, the information obtaining module 302 may further be configured to obtain attribute information of a second-type terminal application when it is determined that the first-type terminal application is currently running, so as to detect and clean the process of the another terminal application again.

For example, details may be specifically as follows:

The information obtaining module 302 may include the following components.

(1) A frame freezing detection unit is configured to detect whether frame freezing occurs during running of the first-type terminal application, when it is determined that the first-type terminal application is currently running.

The frame freezing detection unit may further use the following manners to determine whether frame freezing occurs, which may specifically include:

(a) a detection subunit, configured to detect a quantity of screen frames;

(b) a first determining subunit, configured to determine that frame freezing occurs during running of the first-type terminal application, when it is determined that the quantity of screen frames is less than a preset threshold; and (c) a second determining subunit, configured to determine that frame freezing does not occur during running of the first-type terminal application, when it is determined that the quantity of screen frames is greater than or equal to the preset threshold.

(2) An obtaining unit is configured to obtain the attribute information of the second-type terminal application, when it is determined that frame freezing occurs during running of the first-type terminal application.

That is, occurrence of a frame freezing phenomenon may be detected by using another technology means such as counting the quantity of screen frames, and then acceleration is immediately performed on the terminal once to clean unrelated processes.

In some implementations, a terminal may also provide a quick entry (for example, a floating window), so that a user manually cleans a process in a running process of the first-type terminal application, and performs acceleration anywhere anytime. Therefore, the apparatus may further include:

a receiving module, configured to receive, by using a preset acceleration control, an operating instruction entered by a user; and the process terminating module 303 is further configured to end, triggered by the user-entered operating instruction, the process of the second-type terminal application according to the attribute information of the second-type terminal application.

During specific implementation, each module and unit may be implemented as an independent entity, or may be arbitrarily combined as a same entity or several entities for implementation. For specific implementation of each module and unit, reference may be made to the foregoing second method embodiment, and details are not described herein again.

It may be known from the foregoing description that according to the terminal application process management apparatus provided in this embodiment, a first-type terminal application set is preset, the first-type terminal application set including multiple first-type terminal applications; the first-type terminal application set is detected in real time; and when it is determined that the first-type terminal application set is currently trigger-started, it may be considered that a next operation of a user may be to run a first-type terminal application in the set, so that processes of corresponding terminal applications need to be ended according to attribute information of terminal applications that are currently running on the terminal. Subsequently, when the first-type terminal application is trigger-started, a process of another terminal application needs to be cleaned. Finally, in a running process of the first-type terminal application, the process of the another terminal application is detected and cleaned again. Process cleaning is performed for three times, so that it is ensured that the first-type terminal application that needs to run runs smoothly without frame freezing. Compared with the existing manner in which a user needs to manually trigger acceleration, in this embodiment, an acceleration operation of a terminal application is simplified, and acceleration efficiency of the terminal application is improved.

Fifth Embodiment

Figure 5:
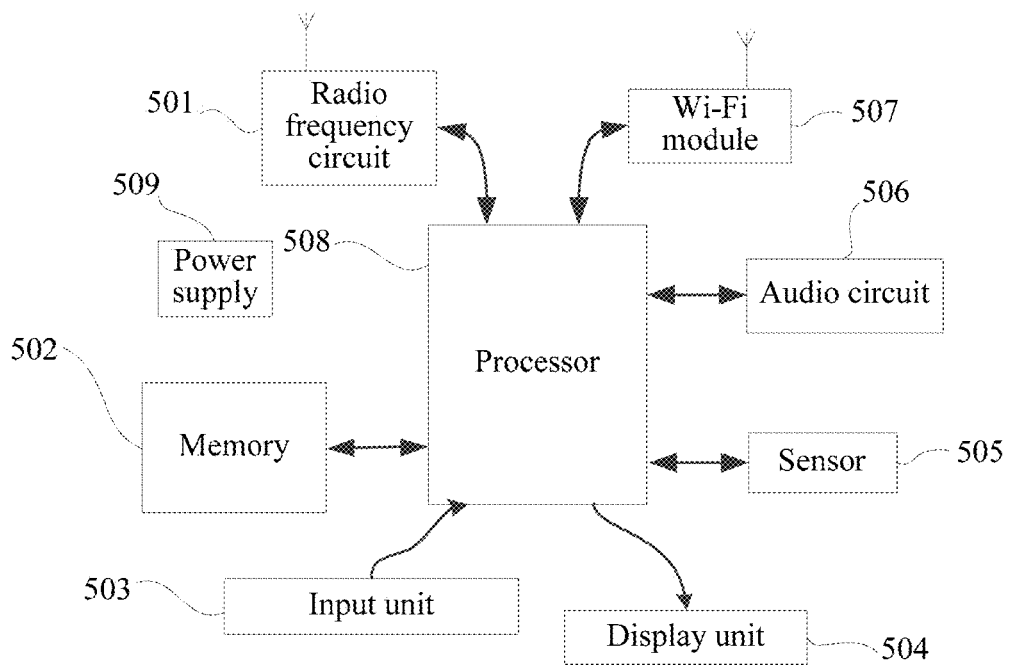
FIG. 5 is a schematic structural diagram of a terminal according to a fifth embodiment of the present invention.

This embodiment of the present invention further provides a terminal. As shown in FIG. 5, the terminal may include components such as a radio frequency (RF) circuit 501, a memory 502 including one or more computer readable storage media, an input unit 503, a display unit 504, a sensor 505, an audio circuit 506, a Wireless Fidelity (Wi-Fi) module 507, a processor 508 including one or more processing cores, and a power supply 509. A person skilled in the art may understand that a terminal structure shown in FIG. 5 constitutes no limitation to the terminal, and the terminal may include more or fewer components than those shown in the figure, or some components may be combined, or a different component deployment may be used.

The RF circuit 501 may be configured to receive and send signals during an information receiving and sending process or a call process. Particularly, the RF circuit 501 receives downlink information from a base station, then delivers the downlink information to one or more processors 508 for processing, and sends related uplink data to the base station. Generally, the RF circuit 501 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 501 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, and Short Message Service (SMS).

The memory 502 may be configured to store a software program and module, such as modules described in FIGS. 3 and 4 above. The processor 508 runs the software program and module stored in the memory 502, to implement various functional applications and data processing. The memory 502 may mainly include a program storage area and a data storage area. The program storage area may store an operating system, an application program required by at least one function (such as a sound playback function and an image display function), and the like. The data storage area may store data (such as audio data and an address book) created according to use of the terminal. In addition, the memory 502 may include a high speed random access memory, and may also include a non-volatile memory, such as at least one magnetic disk storage device, a flash memory, or another volatile solid-state storage device. Correspondingly, the memory 502 may further include a memory controller, so as to provide access of the processor 508 and the input unit 503 to the memory 502.

The input unit 503 may be configured to receive input digit or character information, and generate a keyboard, mouse, joystick, optical, or track ball signal input related to the user setting and function control. Specifically, in a specific embodiment, the input unit 503 may include a touch-sensitive surface and another input device. The touch-sensitive surface, also referred to as a touchscreen or a touch panel, may collect a touch operation of a user on or near the touch-sensitive surface (such as an operation of a user on or near the touch-sensitive surface by using any suitable object or accessory, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 508. Moreover, the touch controller can receive and execute a command sent from the processor 508. In addition, the touch-sensitive surface may be a resistive, capacitive, infrared, or surface sound wave type touch-sensitive surface. In addition to the touch-sensitive surface, the input unit 503 may further include the another input device. Specifically, the another input device may include, but is not limited to, one or more of a physical keyboard, a functional key (such as a volume control key or a switch key), a track ball, a mouse, and a joystick.

The display unit 504 may be configured to display information input by the user or information provided for the user, and various graphical user interfaces of the terminal. The graphical user interfaces may include a graph, a text, an icon, a video, and any combination thereof. The display unit 504 may include a display panel. Optionally, the display panel 504 may be configured by using a liquid crystal display (LCD), an organic light-emitting diode (OLED), or the like. Further, the touch-sensitive surface may cover the display panel. After detecting a touch operation on or near the touch-sensitive surface 131, the touch-sensitive surface 131 transfers the touch operation to the processor 508, so as to determine the type of the touch event. Then the processor 508 provides a corresponding visual output on the display panel according to the type of the touch event. Although, in FIG. 5, the touch-sensitive surface and the display panel are used as two separate components to implement input and output functions, in some embodiments, the touch-sensitive surface and the display panel may be integrated to implement the input and output functions.

The terminal may further include at least one sensor 505, such as an optical sensor, a motion sensor, and other sensors. Specifically, the optical sensor may include an ambient light sensor and a proximity sensor. The ambient light sensor may adjust luminance of the display panel according to brightness of the ambient light. The proximity sensor may switch off the display panel and/or backlight when the terminal is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal, are not further described herein.

The audio circuit 506, a loudspeaker, and a microphone may provide audio interfaces between the user and the terminal. The audio circuit 506 may convert received audio data into an electric signal and transmit the electric signal to the loudspeaker. The loudspeaker converts the electric signal into a sound signal for output. On the other hand, the microphone converts a collected sound signal into an electric signal. The audio circuit 506 receives the electric signal and converts the electric signal into audio data, and outputs the audio data to the processor 508 for processing. Then, the processor 508 sends the audio data to, for example, another terminal device by using the RF circuit 501, or outputs the audio data to the memory 502 for further processing. The audio circuit 506 may further include an earplug jack, so as to provide communication between a peripheral earphone and the terminal.

Wi-Fi is based on a short distance wireless transmission technology. The terminal may help, by using the Wi-Fi module 507, the user to receive and send emails, browse a web page, access streaming media, and the like, which provides wireless broadband Internet access for the user. Although FIG. 5 shows the Wi-Fi module 507, it may be understood that the Wi-Fi module 570 is not a necessary component of the terminal, and when required, the Wi-Fi module 507 may be omitted as long as the scope of the essence of the present disclosure is not changed.

The processor 508 is the control center of the terminal, and is connected to various parts of an entire mobile phone by using various interfaces and lines. By running or executing the software program and/or module stored in the memory 502, and invoking the data stored in the memory 502, the processor 508 performs various functions and data processing of the terminal, thereby performing overall monitoring on the mobile phone. Optionally, the processor 508 may include the one or more processing cores. In some implementations, the processor 508 may integrate an application processor and a modem. The application processor mainly processes an operating system, a user interface, an application program, and the like. The modem mainly processes wireless communication. It may be understood that the foregoing modem may also not be integrated into the processor 508.

The terminal further includes the power supply 509 (such as a battery) for supplying power to the components. In some implementations, the power supply may be logically connected to the processor 508 by using a power management system, thereby implementing functions such as charging, discharging and power consumption management by using the power management system. The power supply 509 may further include one or more of any component such as a direct current power supply or an alternating current power supply, a re-charging system, a power failure detection circuit, a power supply converter or inverter, and a power supply status indicator.

Although not shown in the figure, the terminal may further include a camera, a Bluetooth module, and the like, and details are not further described herein. Specifically, in this embodiment, the processor 508 in the terminal may load executable files corresponding to processes of one or more application programs to the memory 502 according to the following instructions, and the processor 508 runs the application programs stored in the memory 502 to implement various functions:

detecting a first-type terminal application to obtain a detection result, the first-type terminal application being a preset terminal application that needs to be accelerated but has not been started yet; obtaining attribute information of a second-type terminal application when the detection result indicates that the first-type terminal application is trigger-started, the second-type terminal application being another currently-running terminal application; and terminating a process of the second-type terminal application according to the attribute information of the second-type terminal application until there is sufficient resource for starting the first-type terminal application.

In some implementations, the processor 508 may further be configured to: after the operation of terminating a process of the second-type terminal application, obtain the attribute information of the second-type terminal application when it is determined that the first-type terminal application is currently running; and end the process of the second-type terminal application according to the attribute information of the second-type terminal application.

In some implementations, the processor 508 may further be configured to: after the operation of terminating a process of the second-type terminal application, obtain the attribute information of the second-type terminal application when it is determined that the first-type terminal application is currently running; receive, by using a preset acceleration control, an operating instruction entered by a user; and end, triggered by the user-entered operating instruction, the process of the second-type terminal application according to the attribute information of the second-type terminal application.

In some implementations, the processor 508 may further be configured to: detect whether frame freezing occurs during running of the first-type terminal application, when it is determined that the first-type terminal application is currently running; and obtain the attribute information of the second-type terminal application, when it is determined that frame freezing occurs during running of the first-type terminal application.

In some implementations, the processor 508 may further be configured to: detect a quantity of screen frames; and determine that frame freezing occurs during running of the first-type terminal application, when it is determined that the quantity of screen frames is less than a preset threshold; or determine that frame freezing does not occur during running of the first-type terminal application, when it is determined that the quantity of screen frames is greater than or equal to the preset threshold.

In some implementations, the processor 508 may further be configured to: before the detecting a first-type terminal application to obtain a detection result, determining whether there is a preset first-type local terminal application set, the first-type terminal application set including at least one first-type terminal application; and detecting a preset first-type terminal application set if locally there is the preset first-type terminal application set, and obtaining attribute information of currently-running terminal applications when it is determined that the terminal application set is currently trigger-started, terminating processes of the corresponding terminal applications according to the attribute information of the currently-running terminal applications, and performing the step of detecting a first-type terminal application; or performing the step of detecting a first-type terminal application, if locally there is no preset first-type terminal application set.

It may be known from the foregoing description that in the terminal provided in this embodiment, a preset first-type terminal application that needs to be accelerated is detected. If it is detected that the first-type terminal application is currently trigger-started, it may be considered that currently a user needs to run the trigger-started first-type terminal application, and a process of another corresponding terminal application needs to be ended according to attribute information of the another currently-running terminal application, so as to ensure that the first-type terminal application that needs to run runs smoothly without frame freezing. Compared with the existing manner in which a user needs to manually trigger acceleration, in this embodiment, an acceleration operation of a terminal application is simplified, and acceleration efficiency of the terminal application is improved.

In the foregoing embodiments, the descriptions of the embodiments have respective focuses. For a part that is not described in detail in an embodiment, reference may be made to the foregoing detailed description of the terminal application process management method, and details are not described herein again.

The terminal application process management apparatus provided in the embodiments of the present invention may be, for example, a computer, a tablet computer, or a mobile phone that has a touch function. The terminal application process management apparatus and the terminal application process management method in the foregoing embodiments belong to a same concept. The terminal application process management apparatus may operate any method provided in the terminal application process management method embodiments. For a detailed implementation process, refer to the terminal application process management method embodiment, and details are not described herein again.

It should be noted that for the terminal application process management method described in the present disclosure, a person of ordinary skill in the art may understand that all or some of the procedures of the terminal application process management method according to the embodiments of the present invention may be implemented by a computer program controlling relevant hardware. The computer program may be stored in a non-transitory computer readable storage medium, for example, stored in a memory of a terminal, and executed by at least one processor in the terminal. The execution process may include, for example, the procedures of the embodiments of the terminal application process management method. The storage medium may be a magnetic disk, an optical disc, a read-only memory (ROM), a random access memory (RAM), or the like.

For the terminal application process management apparatus in the embodiments of the present invention, the functional modules thereof may be integrated into one processing chip, or each of the modules may exist alone physically, or two or more modules may be integrated into one module. The integrated module may be implemented in the form of hardware, or may be implemented in the form of a software functional module. If the integrated module is implemented in the form of a software functional module and sold or used as an independent product, the integrated module may be stored in a non-transitory computer readable storage medium. The storage medium may be, for example, a ROM, a magnetic disk, or an optical disc.

The terminal application process management method and apparatus provided in the embodiments of the present invention are described above in detail. Although the principles and implementation manners of the present disclosure are described by using specific examples in this specification, the foregoing descriptions of the embodiments are merely intended to help understand the method and core idea of the method of the present disclosure. In addition, a person of ordinary skill in the art may make modifications to the specific implementation manners and application range according to the idea of the present disclosure. In conclusion, the content of the specification should not be construed as a limitation to the present disclosure.

What is claimed is:

1. A terminal application process management method performed at a terminal having one or more processors and memory for storing programs to be executed by the one or more processors, the method comprising:
   obtaining, by the terminal, attribute information of currently-running terminal application;
   detecting, by the terminal, that a first-type terminal application set is being trigger-started;
   in response to the detecting, terminating, by the terminal, one or more of the currently-running terminal applications until the obtained attribute information meets predefined criteria;
   detecting, by the terminal, a first-type terminal application to obtain a detection result, the first-type terminal application being a preset terminal application that needs to be accelerated but has not been started yet;

in accordance with the detection result indicating that the first-type terminal application is being trigger-started:
terminating, by the terminal, a process of a second-type terminal application according to attribute information of the second-type terminal application until there is sufficient resource for starting the first-type terminal application, wherein the second-type terminal application is a currently-running terminal application that has not been terminated by the first terminating.

2. The terminal application process management method according to claim 1, further comprising:
after terminating the process of the second-type terminal application:
obtaining the attribute information of another second-type terminal application when it is determined that the first-type terminal application is currently running; and
terminating the process of the second-type terminal application according to the attribute information of the second-type terminal application.

3. The terminal application process management method according to claim 1, further comprising:
after terminating the process of the second-type terminal application:
obtaining the attribute information of another second-type terminal application when it is determined that the first-type terminal application is currently running;
receiving, by using a preset acceleration control, an operating instruction entered by a user; and
terminating, triggered by the user-entered operating instruction, the process of the second-type terminal application according to the attribute information of the second-type terminal application.

4. The terminal application process management method according to claim 2, wherein the operation of obtaining the attribute information of another second-type terminal application when it is determined that the first-type terminal application is currently running comprises:
detecting whether frame freezing occurs during running of the first-type terminal application, when it is determined that the first-type terminal application is currently running; and
obtaining the attribute information of the second-type terminal application, when it is determined that frame freezing occurs during running of the first-type terminal application.

5. The terminal application process management method according to claim 4, wherein the operation of detecting whether frame freezing occurs during running of the first-type terminal application comprises:
detecting a quantity of screen frames; and
determining that frame freezing occurs during running of the first-type terminal application, when it is determined that the quantity of screen frames is less than a preset threshold; and
determining that frame freezing does not occur during running of the first-type terminal application, when it is determined that the quantity of screen frames is greater than or equal to a preset threshold.

6. A terminal, comprising:
one or more processors;
memory; and
programs stored in the memory that, when executed by the one or more processors, cause the terminal to perform a plurality of operations including:
obtaining attribute information of currently-running terminal applications;
detecting that a first-type terminal application set is being trigger-started;
in response to the detecting, terminating one or more of the currently-running applications until the obtained attribute information meets predefined criteria;
detecting a first-type terminal application to obtain a detection result, the first-type terminal application being a preset terminal application that needs to be accelerated but has not been started yet;
in accordance with the detection result indicating that the first-type terminal application is being trigger-started:
terminating a process of a second-type terminal application according to the attribute information of the second-type terminal application until there is sufficient resource for starting the first-type terminal application, wherein the second-type terminal application is a currently-running terminal application that has not been terminated by the first terminating.

7. The terminal according to claim 6, wherein the terminal is further configured to obtain the attribute information of the second-type terminal application when it is determined that the first-type terminal application is currently running.

8. The terminal according to claim 6, wherein the terminal is further configured to:
receive, by using a preset acceleration control, an operating instruction entered by a user; and
terminate, triggered by the user-entered operating instruction, the process of the second-type terminal application according to the attribute information of the second-type terminal application.

9. The terminal according to claim 7, wherein the terminal is further configured to:
detect whether frame freezing occurs during running of the first-type terminal application, when it is determined that the first-type terminal application is currently running; and
obtain the attribute information of the second-type terminal application, when it is determined that frame freezing occurs during running of the first-type terminal application.

10. The terminal according to claim 9, wherein the terminal is further configured to:
detect a quantity of screen frames; and
determine that frame freezing occurs during running of the first-type terminal application, when it is determined that the quantity of screen frames is less than a preset threshold; and
determining that frame freezing does not occur during running of the first-type terminal application, when it is determined that the quantity of screen frames is greater than or equal to a preset threshold.

11. A non-transitory computer readable storage medium storing a plurality of programs in connection with a terminal having one or more processors, which, when executing the plurality of programs, cause the terminal to:
obtain attribute information of currently-running terminal application;
detect that a first-type terminal application set is being trigger-started;
in response to the detecting, terminate one or more of the currently-running terminal applications until the obtained attribute information meets predefined criteria;
detect a first-type terminal application to obtain a detection result, the first-type terminal application being a preset terminal application that needs to be accelerated but has not been started yet;

in accordance with the detection result indicating that the first-type terminal application is being trigger-started:

terminate a process of the second-type terminal application according to the attribute information of the second-type terminal application until there is sufficient resource for starting the first-type terminal application, wherein the second-type terminal application is a currently-running terminal application that has not been terminated by the first terminating.

* * * * *